(12) United States Patent
Oren

(10) Patent No.: US 11,634,061 B2
(45) Date of Patent: *Apr. 25, 2023

(54) PROPPANT DELIVERY SYSTEM

(71) Applicant: OREN TECHNOLOGIES, LLC, Houston, TX (US)

(72) Inventor: Joshua Oren, Houston, TX (US)

(73) Assignee: SANDBOX ENTERPRISES, LLC, Katy, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/078,483

(22) Filed: Oct. 23, 2020

(65) Prior Publication Data
US 2021/0039544 A1    Feb. 11, 2021

Related U.S. Application Data

(63) Continuation of application No. 16/244,185, filed on Jan. 10, 2019, now Pat. No. 10,814,767, which is a continuation of application No. 15/616,783, filed on Jun. 7, 2017, now Pat. No. 10,239,436, which is a continuation of application No. 15/152,744, filed on May 12, 2016, now Pat. No. 9,758,081, which is a continuation of application No. 14/175,340, filed on Feb. 7, 2014, now Pat. No. 9,421,899, and a continuation-in-part of application No. 13/628,702, filed on Sep. 27, 2012, now Pat. No. 10,464,741, which is a continuation-in-part of application No. 13/555,635, filed on Jul. 23, 2012, now Pat. No. 9,718,610.

(51) Int. Cl.
*B60P 1/52*     (2006.01)
*B60P 1/56*     (2006.01)

(52) U.S. Cl.
CPC .. *B60P 1/52* (2013.01); *B60P 1/56* (2013.01)

(58) Field of Classification Search
CPC ..................................... B60P 1/52; B60P 1/56
See application file for complete search history.

(56) References Cited

U.S. PATENT DOCUMENTS

| 2,564,020 | A | * | 8/1951 | Mengel | ..................... | B60P 1/56 |
| | | | | | | 414/523 |
| 3,896,708 | A | * | 7/1975 | De Vries | .............. | B65D 31/142 |
| | | | | | | 493/189 |

(Continued)

FOREIGN PATENT DOCUMENTS

| EP | E102507 A4 | 8/2017 |
| WO | 2015119799 A1 | 8/2015 |

*Primary Examiner* — Kaitlin S Joerger
(74) *Attorney, Agent, or Firm* — Osha Bergman Watanabe & Burton LLP

(57) ABSTRACT

An apparatus for delivering proppant to a well site includes a plurality of proppant containers. The apparatus also includes a support structure having a bed and a structural framework extending down from the bed. The plurality of proppant container are structurally supported on top of the bed. A bin is disposed within the structural frame work below the bed. A conveyor cooperates with the bin for transporting proppant from the bin to a desired location at the well site. Proppant discharged from one or more of the plurality of proppant containers positioned on the bed above the bin is received in the bin and delivered to the well site by the conveyor.

14 Claims, 4 Drawing Sheets

(56) References Cited

U.S. PATENT DOCUMENTS

| | | | | |
|---|---|---|---|---|
| 8,313,278 | B2* | 11/2012 | Simmons | B60P 7/08 |
| | | | | 414/532 |
| 8,585,341 | B1* | 11/2013 | Oren | B65D 90/587 |
| | | | | 414/411 |
| 9,340,353 | B2* | 5/2016 | Oren | B65G 47/19 |
| 9,421,899 | B2* | 8/2016 | Oren | B60P 1/52 |
| 9,758,081 | B2* | 9/2017 | Oren | B60P 1/52 |
| 2011/0222983 | A1* | 9/2011 | Dugie | B60P 7/0807 |
| | | | | 410/92 |
| 2012/0017812 | A1* | 1/2012 | Renyer | A01C 7/10 |
| | | | | 111/130 |
| 2014/0023465 | A1* | 1/2014 | Oren | B65D 88/30 |
| | | | | 414/288 |
| 2015/0115589 | A1* | 4/2015 | Thiessen | B60P 3/2295 |
| | | | | 280/837 |

* cited by examiner

PROPPANT DELIVERY SYSTEM

CROSS-REFERENCE TO RELATED APPLICATIONS

The present application is a continuation which claims priority to and the benefit of U.S. application Ser. No. 16/244,185, filed Jan. 10, 2019, which is a continuation of U.S. application Ser. No. 15/616,783, filed Jun. 7, 2017, which is a continuation of U.S. application Ser. No. 15/152,744, filed May 12, 2016, which is a continuation of U.S. application Ser. No. 14/175,340, filed Feb. 7, 2014, each of which is incorporated herein by reference in their entireties. U.S. application Ser. No. 15/152,744 is also a continuation-in-part of U.S. application Ser. No. 13/628,702, filed Sep. 27, 2012, which is a continuation-in-part of U.S. application Ser. No. 13/555,635, filed Jul. 23, 2012, each of which is incorporated herein by reference in their entireties.

FIELD

The present disclosure relates to the delivery of proppant to a well site. More particularly, the present disclosure relates to proppant containers and techniques for causing the proppant containers to discharge proppant therein onto a conveyor, or other means, for transport to the well site. The present disclosure also relates to a truck trailer that is suitable for allowing loads thereon to be translatably moved along the length of the trailer.

BACKGROUND

Hydraulic fracturing is the propagation of fractions in a rock layer caused by the presence of pressurized fluid. Hydraulic fractures may form naturally, in the case of veins or dikes, or may be man-made in order to release petroleum, natural gas, coal seam gas, or other substances for extraction. Fracturing is done from a wellbore drilled into reservoir rock formations. The energy from the injection of a highly-pressurized fracking fluid creates new channels in the rock which can increase the extraction rates and ultimate recovery of fossil fuels. The fracture width is typically maintained after the injection by introducing a proppant into the injected fluid. Proppant is a material, such as grains of sand, ceramic, or other particulates, that prevent the fractures from closing when the injection is stopped.

With the rise of hydraulic fracturing over the past decade, there is a steep climb in proppant demand. Global supplies are currently tight. The number of proppant suppliers worldwide has increased since 2000 from a handful to well over fifty sand, ceramic proppant and resin-coat producers.

By far the dominant proppant is silica sand, made up of ancient weathered quartz, the most common mineral in the Earth's continental crust. Unlike common sand, which often feels gritty when rubbed between the fingers, sand used as a proppant tends to roll to the touch as a result of its round, spherical shape and tightly-graded particle distribution. Sand quality is a function of both deposit and processing. Grain size is critical, as any given proppant must reliably fall within certain mesh ranges, subject to downhole conditions and completion design. Generally, coarser proppant allows the higher flow capacity due to the larger pore spaces between grains. However, it may break down or crush more readily under stress due to the relatively fewer grain-to-grain contact points to bear the stress often incurred in deep oil- and gas-bearing formations.

Typically, in any hydraulic fracturing operation, a large amount of such proppant is required. Typically, it has been difficult to effectively store the proppant at the fracturing sites. Additionally, it has been found to be rather difficult to effectively transport the proppant to the desired location. Often, proppant is hauled to the desired locations on the back of trucks and is dumped onsite. Under such circumstances, the proppant is often exposed to adverse weather conditions. This will effectively degrade the quality of the proppant during its storage. Additionally, the maintenance of proppant in containers at the hydraulic fracturing site requires a large capital investment in storage facilities. Typically, the unloading of such storage facilities is carried out on a facility-by-facility basis. As such, there is a need to be able to effectively transport the proppant to and store the proppant in a desired location adjacent to the hydraulic fracturing location.

In the past, there have been various patent applications publications that have been published and patents issued by the present inventor in relation to containers for the transport of proppant. For example, U.S. Pat. No. 8,505,780, issued on Aug. 13, 2013 to the present inventor, describes a proppant storage vessel that has a first container with an interior volume and a second container supported in spaced relation above the first container. The first container has a bottom hatch affixed to a bottom wall thereof. The bottom hatch is movable between an open position and a closed position. The first container has an opening at a top wall thereof. The second container has bottom hatch formed on a bottom wall thereof. The bottom hatch of the second container is aligned with the opening of the first container such that a proppant in the second container can flow through the hatch thereof into the interior volume of the first container. Each of the containers includes first, second, third and fourth inclined surfaces positioned in the interior volume and extending from the respective side walls and end walls thereof toward the bottom hatch.

U.S. Patent Publication No. 2013/0164112, published on Jun. 27, 2013 to the present inventor, describes a system of delivering and storing proppant for use at a well site and container for such proppant. The method includes the step of transporting a load of proppant in a vessel to a desired location, moving the load of proppant from the vessel into a container so as to create a proppant-loaded container, unloading the proppant-loaded container into a pneumatic bulk trailer, and transporting the unloaded proppant in the pneumatic bulk trailer to well site. The container is placed onto a bed of a truck and moved in proximity to the vessel. The proppant-loaded container is placed onto a tilting mechanism and then tilted so that the proppant is discharged through a flow gate of a container into a hopper.

U.S. Patent Publication No. 2013/0161211, published on Jun. 27, 2013 to present inventor, describes a proppant storage vessel that has a first container with an interior volume and a second container supported in spaced relationship above the first container. The first container has a bottom hatch affixed to a bottom wall thereof. The bottom hatch is movable between an open position and a closed position. The second container has bottom hatch formed on a bottom wall thereof. The bottom hatch of the second container is aligned with the opening of the first container such that a proppant in the second container can flow through the hatch thereof into the interior volume of the first container.

A variety of designs patents have issued relating to containers for the transport and storage of proppant. For example, U.S. Design Pat. Nos. 688,349, 688,350 and 688,351, issued on Aug. 20, 2013 to the present inventor, all describe various designs of proppant vessels. U.S. Design Pat. No. D688,722, issued on Aug. 27, 2013 to the present inventor, also describes a design of a proppant vessel.

In the past, various patents have also issued relating to container trailers. For example, U.S. Pat. No. 4,541,768, issued on Sep. 17, 1985 to Walker et al., describes a container trailer having a vertically movable roller tray with parallel rollers thereon which, when tangent to the roll plane, allow the container to be moved onto or off of the trailer. A vertically movable caster tray of the trailer has fixed caster wheels thereon with their axes of rotation intersecting a vertical axis near the center of the trailer. When the wheels provide sole support for the container at the roll plane, the container may be rotated about the vertical axis to any desired position.

U.S. Pat. No. 7,100,896, issued on Sep. 5, 2006 to H. Cox, describes a shipping container handling system that includes a plurality of powered jacks each of which includes upper and lower container attachment members and are selectively engageable with upper and lower corner lock castings of the containers. Each attachment member is carried by a guide sleeve slidably mounted relative to a vertical standard with an upper guide sleeve being drivingly engaged with a power driven member such that, with the attachment members engaged with the corner locks of the container, the simultaneous activation of four jacks allows the elevation and/or lowering of a shipping container relative to a vehicle.

U.S. Pat. No. 7,134,829 issued on Nov. 14, 2006 to Quinze et al., provides a cargo trailer that includes a frame, at least two axles mounted to the frame, and a deck. The axles have wheels at opposite ends of the axles for movably supporting the frame above the earth. The deck is pivotally mounted to the frame and is pivotable about a first axis relative to the frame and a second axis relative to the frame via at least two supports.

U.S. Pat. No. 7,866,933, issued on Jan. 11, 2011 to Welch et al., discloses a container trailer that has a frame positionable as a single unit about a container such that the frame can be attached to the container in four regions of the container so as to lift the container. The trailer frame can be positioned about the container by laterally expanding and retracting, pivoting about a horizontal axis, and pivoting about a vertical axis.

U.S. Pat. No. 7,802,958, issued on Sep. 28, 2010 to Garcia et al., teaches a versatile trailer deck and to a method for moving cargo onto such a trailer deck. The trailer deck can have first and second moving apparatus attached to a deck member. The first moving apparatus is adapted to move cargo between the back end of the deck member and the front end of the deck member. The second moving apparatus is adapted to rotate cargo from one orientation on the deck member to a second orientation on the deck member. A plurality of rollers are supported on the pivotable deck.

U.S. Pat. No. 7,950,675, issued on May 31, 2011 to Quenzi et al., shows a cargo carrier for movably supporting cargo. The cargo carrier has a frame configured to support the cargo and at least two wheels at each side of the frame. Each of the wheels is rotatably mounted to a respective support arm. The support arms are pivotally mounted to respective sides of the frame and are pivotable relative to the frame to adjust at least one of a height and tilt of the frame relative to a support surface. The cargo carrier can include a deck that is movably mounted to the frame and is longitudinally movable along the frame.

U.S. Pat. No. 8,182,193, issued on May 22, 2012 to Gaudet et al., provides a trailer for transporting freight containers. This trailer has a frame having a front frame section which is adapted to be coupled to a suitable road vehicle. A pair of displaceable horizontal side beams are secured to the front frame section and are provided with a hinged rear gate formed by a pair of hinge arms. Container lifting posts are secured to opposed ends of the front frame section and the hinge arms for removable connection to a container positioned between the side beams to lift and lower the container therebetween.

U.S. Pat. No. 8,313,278, issued on Nov. 20, 2012 to Simmons et al., provides a modular interchangeable cargo deck which is configured to be removably and interchangeably attached to a trailer. The deck unit can include a plurality of moving apparatus for moving cargo in a lengthwise direction relative to the deck units and for moving cargo in a vertical direction relative to the deck unit.

In these prior art references, it is quite clear that none of the trailers are adapted for the use in association with delivering proppant to a well site. The complication with such trailers involves the configuration of the proppant storage containers and also the weight of the proppant that is contained within such containers. None of the prior art references are particularly adaptable for allowing the discharge of proppant from a container to a location below the bed of the trailer. Additionally, and furthermore, none of the prior art references disclose a technique whereby the trailer can be relatively easily loaded and/or unloaded through the use of simple lifting mechanisms and/or forklifts.

U.S. Design Pat. No. D688,597, issued on Aug. 27, 2013 to the present inventor, shows a trailer for proppant containers. The trailer has a unique external appearance and is suitable for supporting a container of proppant in a fixed position on a top surface of the trailer.

In accordance with the present disclosure an apparatus and process are provided for proppant to a well site which conveniently and easily allows the proppant to be delivered.

In accordance with the present disclosure an apparatus and process are provided for the delivery of proppant to a well site which allows the proppant containers to be easily placed and removed from the bed of a trailer with simple lifting mechanisms and/or forklifts.

In accordance with the present disclosure an apparatus and process are provided for the delivery of proppant to a well site which minimizes the number of movable components associated with the delivery of proppant.

In accordance with the present disclosure an apparatus and process are provided for the delivery of proppant to a well site which can be easily moved along a roadway or at the well site so as to be located in a desired position.

In accordance with the present disclosure an apparatus and process are provided for the delivery of proppant to a well site that is easy to use, relatively inexpensive and easy to manufacture.

These and other objects and advantages will become apparent from a reading of the attached specification and appended claims.

BRIEF SUMMARY

In one aspect, an apparatus is provided for delivering proppant to a well site. The apparatus includes a support structure having a bed and a structural framework extending down from the bed, which is configured to structurally support a plurality of proppant containers received on top of the bed. A bin is disposed within the structural frame work of the support structure below the bed. A conveyor cooperates with the bin for transporting proppant from the bin to a desired location at the well site. The bin receives proppant discharged from one or more proppant containers positioned on the bed above the bin and is delivered to the well site by the conveyor.

In another aspect, a process is provided for delivering proppant to a well site, which includes: forming a trailer having at least one track of rollers extending longitudinally along a bed of the trailer; placing a first proppant container onto the track of rollers adjacent one end of the bed of the trailer; moving the first proppant container along the track of rollers to a position away from one end of the bed of the trailer; discharging proppant from the first proppant container at the position away from the one end of the bed of the trailer; and conveying the discharge proppant to a location at the well site.

In another aspect, the apparatus includes a plurality of proppant containers. The support structure has a bed and a structural framework extending down from the bed. The plurality of proppant container are structurally supported on top of the bed. A bin is disposed within the structural frame work below the bed. A conveyor cooperates with the bin for transporting proppant from the bin to a desired location at the well site. Proppant discharged from one or more of the plurality of proppant containers positioned on the bed above the bin is received in the bin and delivered to the well site by the conveyor.

In an embodiment, the support structure may include a first end having a trailer hitch extending therefrom and a second end have a pair of wheels rotatably supported thereon. The trailer hitch is configured to be coupled with a tow vehicle for positioning the apparatus at the well site. In this way, the support structure may take the form of a trailer.

In an embodiment, the support structure includes an adjustable dolly coupled to the structural framework for positioning the support structure so that the bed is in a horizontal orientation.

In an embodiment, the bed includes a first container station located at a first end of the support structure, a second container station located at a second end of the support structure opposite the first end, and a third container station located between the first and second container station. The bin is positioned below the third container station.

In an embodiment, the support structure includes first and second longitudinal side beams and first and second end beams extending between the first and second longitudinal side beam. A plurality of cross members are disposed between the first and second end beams along the first and second longitudinal side beams and extend therebetween. The first and second longitudinal side beams and the first and second end beams create a rectangular configuration for the bed.

In an embodiment, the bed includes a track of rollers disposed between the first and second longitudinal side beams supporting the plurality of proppant containers. For example, the track of rollers may include a first track of rollers extending longitudinally along the first longitudinal side beam and a second track of rollers extending longitudinally along the second longitudinal side beam. One or more of the plurality of proppant containers longitudinally translate along the bed on the first and second track of rollers.

The foregoing summary is intended to describe, in particularity, preferred embodiments of an apparatus for delivering proppant to a well site. It is understood that modifications to this preferred embodiment can be made within the scope of the present disclosure. As such, this section should not to be construed, in any way, as limiting of the scope of the present disclosure.

DETAILED DESCRIPTION

Figure 1:
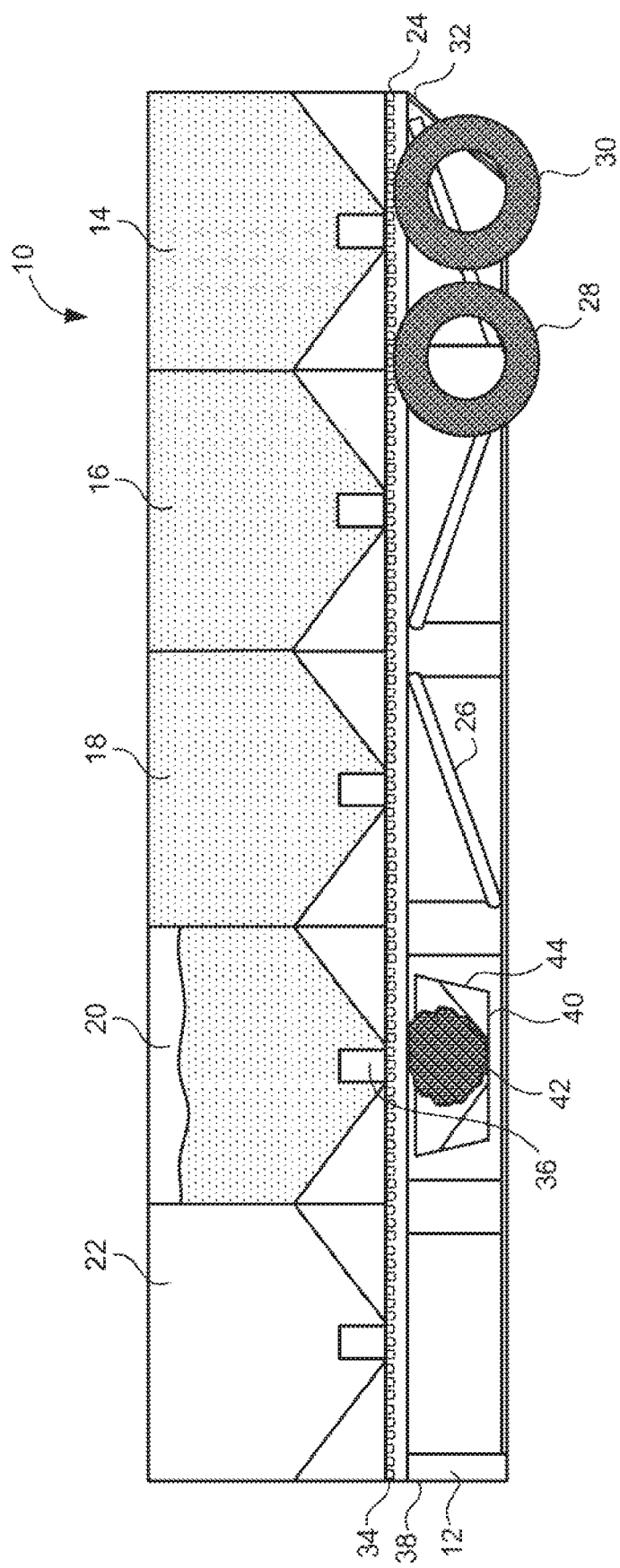
FIG. 1 is a side elevational view showing the apparatus for the delivering of proppant in accordance with the preferred embodiments disclosed herein.

Referring to FIG. 1, there is shown the apparatus 10 in accordance with the teachings of the present disclosure. The apparatus 10 includes a trailer 12 having a plurality of proppant storage containers 14, 16, 18, 20 and 22 positioned on the bed 24 of the trailer 12. The trailer 12 has a structural framework 26 secured to the bed 24 of the trailer 12 so as to enhance the structural integrity of the trailer 12. A pair of wheels 28 and 30 are illustrated as supporting the bed 24 of the trailer 12 adjacent the rear end 32 of the trailer 12. A track of rollers 34 is positioned on the bed 24 of the trailer 12. Each of the containers 14, 16, 18, 20 and 22 is supported by the track of rollers 34.

In FIG. 1, each of the containers 14, 16, and 18 are fully loaded with the proppant material. Container 14 is located at the end 32 of the trailer 12. The container 16 is located adjacent to the end of the container 14 opposite the end 32 of the trailer 12. Similarly, the container 18 is positioned against the end of the container 16 and generally located at the center of the trailer 12. Container 20 is illustrated as being partially filled with proppant material. Container 20 includes a discharge outlet 36 located at the bottom thereof. Each of the containers 14, 16, 18, 20 and 22 will have a discharge outlet 36. The discharge outlet 36 is particularly configured so as to be openable so as to allow for the discharge of proppant from the interior of the container through the bottom of the container. Container 22 is located at the forward end 38 of the trailer 12. Container 22 is illustrated as being empty of proppant material. As such, container 22 represents a discharged container.

In FIG. 1, it can be seen that there is a conveying means 40 positioned below the bed 24 of the trailer 12 in a location between the rearward end 32 and the forward end 38. In particular, the conveying means 40 will be located below the discharge outlet 36 of the container 20. It can be seen in FIG. 1, that the proppant material 42 has been discharged into a bin 44. A conveyor can be cooperative with the bin 44 so as to cause the proppant 42 to be transported to a desired location at the well site. The conveyor can be in the nature of an auger that rotates so as to draw proppant material therealong to the desired location at the well site. The bin 44 can also be in the nature of a blender that is used to blend the proppant material with other chemicals for delivery to the well site.

Figure 2:
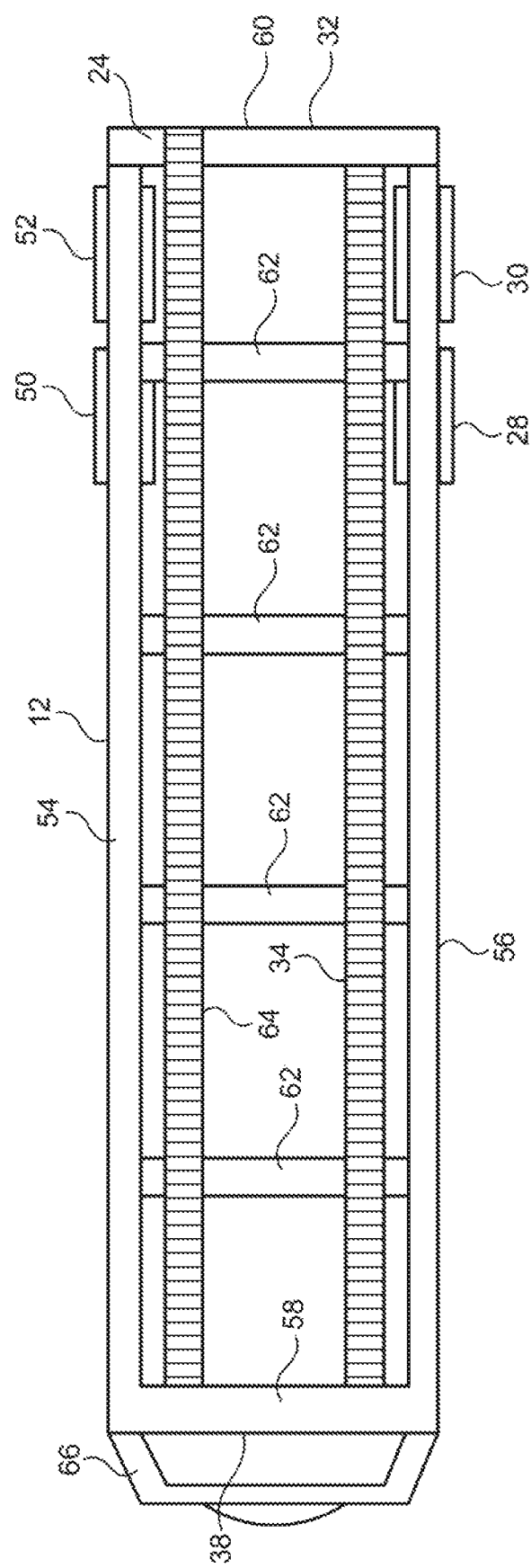
FIG. 2 is a plan view showing the trailer as described herein.

FIG. 2 is a plan view showing the trailer 12. It can be seen that the trailer 12 has a forward end 38 and a rearward end 32. Wheels 28, 30, 50 and 52 are rotatably mounted to the trailer 12 so as to allow the trailer 12 to move upon an underlying surface. The trailer 12 includes side beams 54 and 56. End beams 58 and 60 create a rectangular configuration of the bed 24 of the trailer 12. Cross members 62 extend between the side beams 54 and 56 so as to provide structural integrity of the trailer 12. Various other structural components can be added to these components so as to further enhance the structural integrity of the trailer 12.

In FIG. 2, it can be seen that there is a first track of rollers 34 that extends longitudinally along the bed 24 of the trailer 12 and substantially for the entire length of the trailer 12. A second track of rollers 64 is positioned in spaced parallel relationship to the first track of rollers 34. The tracks of rollers 34 and 64 provide a surface upon which a proppant container can be placed. The rollers are suitably configured so that the containers can be easily moved by simply pushing on one end the proppant container so that the proppant container can translate along the surfaces of the rollers of tracks 34 and 64.

In FIG. 2, it can be seen that there is a trailer hitch 66 formed at the end 38. The trailer hitch 66 allows the trailer 12 to be connected to a towing vehicle. As such, the trailer 12 can be transported to any desired location and properly manipulated at the well site so as to be in proper position such that the conveying means 40 (as shown in FIG. 1) can be placed in a proper position beneath the bed 24 of the trailer 12.

Figure 3:
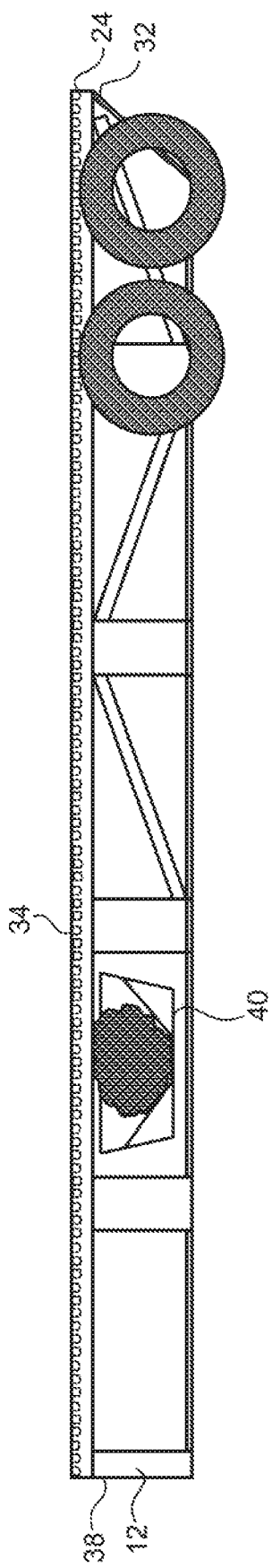
FIG. 3 is a side elevational view showing the trailer in an unloaded condition.

FIG. 3 illustrates an initial step in the process of the present disclosure. In FIG. 3, it can be seen that the trailer 12 has the track of rollers 34 exposed at the top surface thereof. As such, the track of rollers 34 placed upon bed 24 can provide a surface for the receipt of proppant containers thereon. The conveying means 40 is located rearwardly of the front end 38 of the trailer 12 and forward of the rear end 32 of the trailer. In particular, the conveying means 40 will be in a position so as to receive proppant from a container away from the end 32.

In the process of the present disclosure, there is an adjustable dolly or foot 70 that is located adjacent to the front end 38 of the trailer 12. This foot 70 can be suitably adjustable so that the track of rollers 34 is in generally a horizontal orientation. As such, the trailer 12 can be adaptable to various surface inclinations or irregularities.

Figure 4:
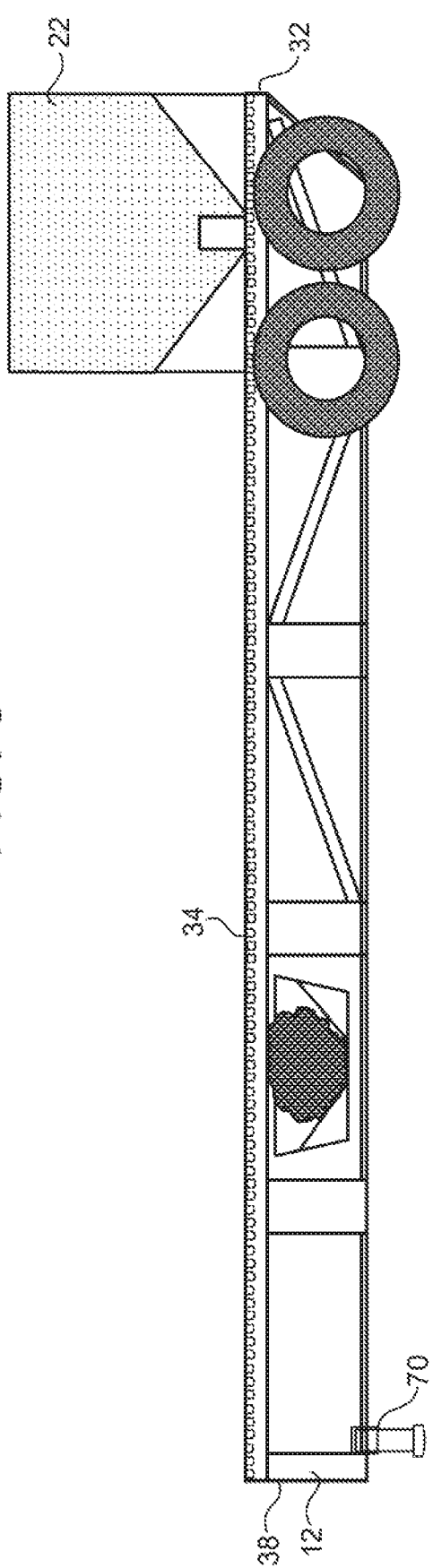
FIG. 4 is a side elevational view showing the trailer with a single proppant storage container loaded onto the end of the trailer.

In FIG. 4, it can be seen that the proppant container 22 is loaded onto the track of rollers 34 adjacent to the end 32. Container 22, as shown in FIG. 4, is filled with proppant material.

Figure 5:
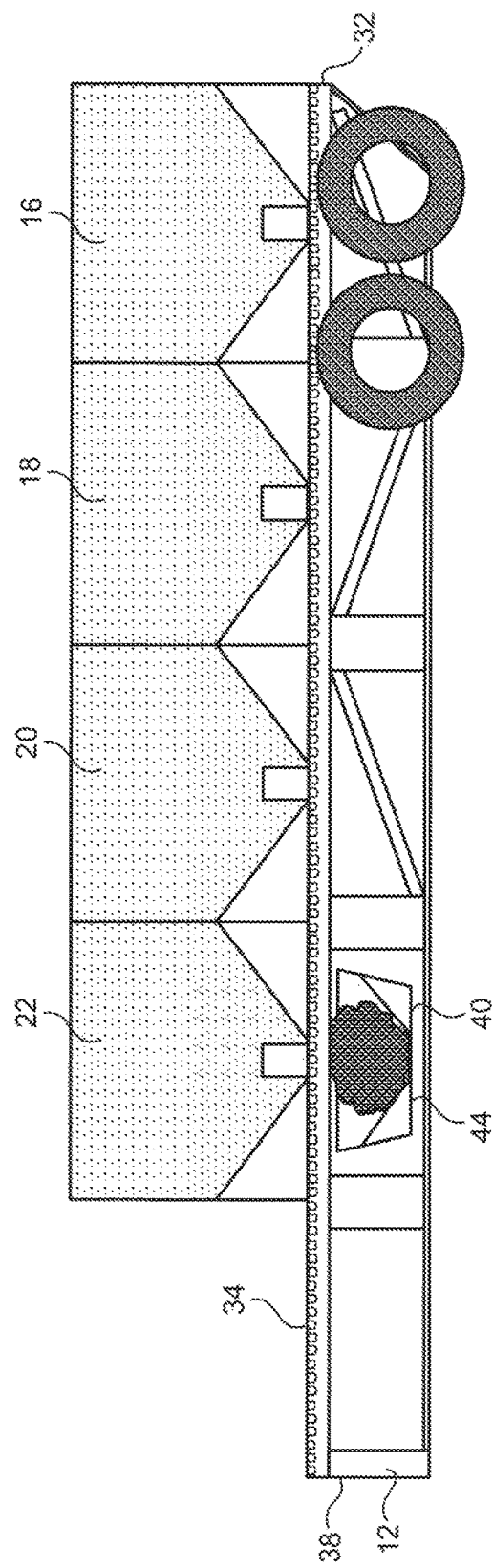
FIG. 5 is a side elevational view showing the trailer with an empty proppant container removed from the forward end the trailer.

In FIG. 5, the proppant container 22 is positioned over the conveying means 40. In order to allow this position to be obtained, another proppant container 20 can be positioned on the track of rollers 34 so as to urge the proppant container 22 away from the end 32 of the trailer 12. Similarly, a proppant container 18 can be placed onto the end 32 of the trailer 12 so as to urge the containers 20 and 22 along the track of rollers 34. Additionally, a proppant container 14 can be placed onto the end 32 of the trailer 12 to urge the containers 18, 20 and 22 further toward the forward end 38 of the trailer 12.

In the configuration show in FIG. 5, the filled containers 14, 18, 20 and 22 are located on the track of rollers 34. The proppant container 22 is located directly above the conveying means 40. As such, container 22 is located in a proper position for discharge. The discharge opening 36 of container 22 can be opened so as to discharge the proppant material into the bin 44 of the conveying means 40. As such, the proper discharge of proppant material can be achieved by the present disclosure. In FIG. 5, each of the proppant containers can be simply and easily loaded upon the track of rollers 34 through the use of a forklift, or other simple lifting mechanism. As such, specialized equipment would not be necessary so as to achieve the proper discharge of proppant material in the manner described hereinabove.

Figure 6:
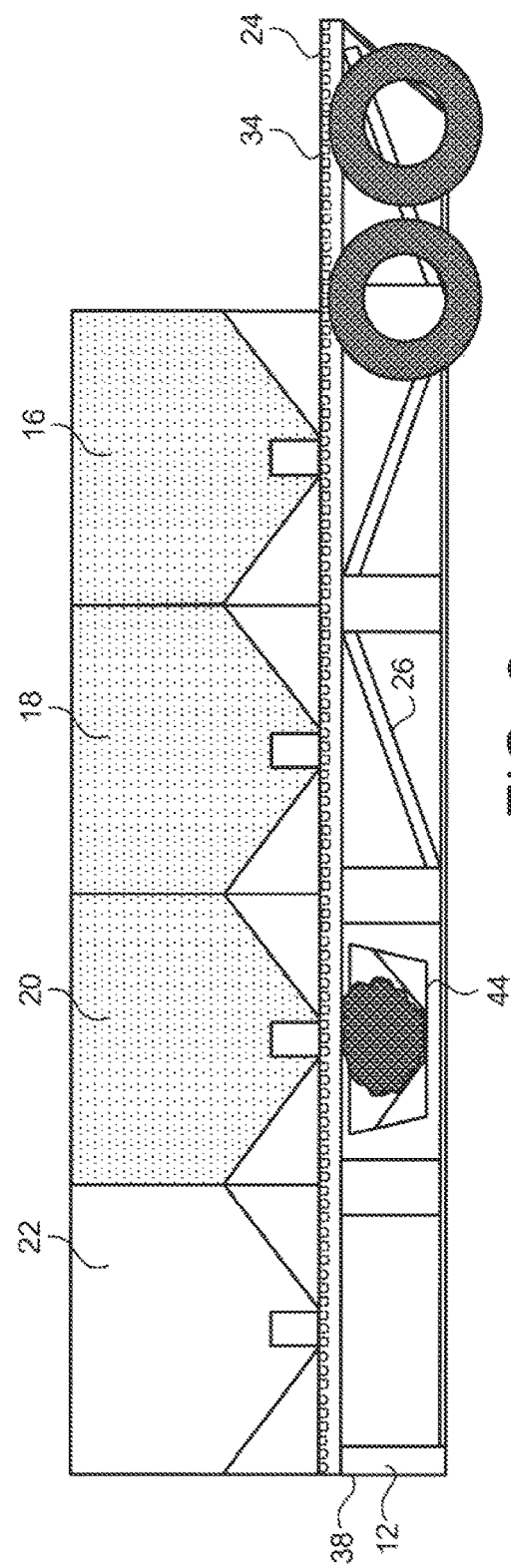
FIG. 6 is a side elevational view showing the trailer with a discharged or empty proppant container positioned in at the forward end of the trailer.

In FIG. 6, it can be seen that the proppant container 22 has been fully discharged and is moved to a position adjacent to the end 38 of the trailer 12. The container 20 is now located in a position above the bin 44 and suitable for discharge. Bin 18 is moved forward so as to urge bin 20 to its proper position. The container 16 is also moved forward along the track of rollers 34. Container 22 is now in a proper condition for removal from the bed 24 of the trailer 12. Since the container 22 is empty, it can easily be removed from the bed 24. The containers 16, 18, 20 and 22 can be moved forward in the manner described hereinabove by the addition of a container 14 (as shown in FIG. 1) upon the track of rollers 34 of trailer 12. As such, the bin 14 will assume the position shown in FIG. 1. As a result, the trailer 12 is capable of handling up to five (5) proppant containers thereon.

In the method of the present disclosure, containers can be continuously loaded onto the trailer 12 for as long as proppant delivery is required. It is only necessary to discharge the container over the conveying means, remove the empty container, and then move the remaining filled containers so that they will move the discharged container toward the end 38 of the trailer 12. This process can continue, as required, until such time as all of the proppant is properly received at the location at the well site.

The present disclosure is believed to be capable of allowing the movement of fully filled proppant containers easily by hand or by mechanical manipulation. For example, a forklift can be used so as to lift a filled proppant container, place the proppant container on the track of rollers, and then urge the proppant container forward so as to push the remaining containers forward. The process of the present disclosure further allows for the filling of the emptied or discharged container during the process. As such, if proppant material is available at the well site, the discharged container can then be replaced onto the track of rollers 34 at the end 32 of the trailer 12 for further continuous processing of proppant material. Ultimately, the discharged proppant containers can be transported by the trailer 12 to other locations for refilling. The present disclosure provides a simple, easy, and convenient manner of providing proper quantities of proppant material for the desired fracturing operations.

The foregoing disclosure and description of the invention is illustrative and explanatory thereof. Various changes in the details of the illustrated construction or in the steps of the described process, can be made within the scope of the appended claims without departing from the true spirit of the invention. The present disclosure should only be limited by the following claims and their legal equivalents.

What is claimed is:
1. An apparatus for delivering proppant to a well site, the apparatus comprising:
   a support structure having a bed and a structural framework extending down from the bed and configured to structurally support a plurality of transportable proppant containers replaceably received on top of the bed; and a bin disposed at a fixed location within the structural frame work below the bed; and a conveyor cooperative with the bin for transporting proppant from the bin to a desired location at the well site;

wherein proppant discharged from one or more transportable proppant containers replaceably positioned on the bed above the bin is received in the bin and delivered to the well site by the conveyor.

2. The apparatus according to claim 1, wherein the support structure further comprises a first end having a trailer hitch extending therefrom and a second end have a pair of wheels rotatably supported thereon, wherein the trailer hitch is configured to be coupled with a tow vehicle for positioning the apparatus at the well site.

3. The apparatus according to claim 2, wherein the support structure further comprises an adjustable dolly coupled to the structural framework for positioning the support structure so that the bed is in a horizontal orientation.

4. The apparatus according to claim 1, wherein the bed comprises a first container station located at a first end of the support structure, a second container station located at a second end of the support structure opposite the first end, and a third container station located between the first and second container station, wherein the bin is positioned below the third container station.

5. The apparatus according to claim 1 wherein the support structure further comprises first and second longitudinal side beams, a first end beam extending between the first and second longitudinal side beam at a first end thereof, a second end beam extending between the first and second longitudinal side beam at a second end thereof, and a plurality of cross members disposed between the first and second end beams along the first and second longitudinal side beams and extending therebetween, wherein the first and second longitudinal side beams and the first and second end beams create a rectangular configuration for the bed.

6. The apparatus according to claim 5, wherein the bed further comprise a track of rollers disposed between the first and second longitudinal side beams and configured to support the plurality of proppant containers.

7. The apparatus according to claim 6, wherein the track of rollers comprises a first track of rollers extending longitudinally along the first longitudinal side beam and a second track of rollers extending longitudinally along the second longitudinal side beam, wherein the first and second track of rollers are configured to longitudinally translate one or more proppant containers along the bed.

8. An apparatus for delivering proppant to a well site, the apparatus comprising:

a plurality of transportable proppant containers;

a support structure having a bed and a structural framework extending down from the bed, wherein the plurality of transportable proppant container are replaceably positioned and structurally supported on top of the bed;

a bin disposed at a fixed location within the structural frame work below the bed; and a conveyor cooperative with the bin for transporting proppant from the bin to a desired location at the well site;

wherein proppant discharged from one or more of the plurality of transportable proppant containers replaceably positioned on the bed above the bin is received in the bin and delivered to the well site by the conveyor.

9. The apparatus according to claim 8, wherein the support structure further comprises a first end having a trailer hitch extending therefrom and a second end have a pair of wheels rotatably supported thereon, wherein the trailer hitch is configured to be coupled with a tow vehicle for positioning the apparatus at the well site.

10. The apparatus according to claim 9, wherein the support structure further comprises an adjustable dolly coupled to the structural framework for positioning the support structure so that the bed is in a horizontal orientation.

11. The apparatus according to claim 8, wherein the bed comprises a first container station located at a first end of the support structure, a second container station located at a second end of the support structure opposite the first end, and a third container station located between the first and second container station, wherein the bin is positioned below the third container station.

12. The apparatus according to claim 8 wherein the support structure further comprises first and second longitudinal side beams, a first end beam extending between the first and second longitudinal side beam at a first end thereof, a second end beam extending between the first and second longitudinal side beam at a second end thereof, and a plurality of cross members disposed between the first and second end beams along the first and second longitudinal side beams and extending therebetween, wherein the first and second longitudinal side beams and the first and second end beams create a rectangular configuration for the bed.

13. The apparatus according to claim 12, wherein the bed further comprise a track of rollers disposed between the first and second longitudinal side beams supporting the plurality of proppant containers.

14. The apparatus according to claim 13, wherein the track of rollers comprises a first track of rollers extending longitudinally along the first longitudinal side beam and a second track of rollers extending longitudinally along the second longitudinal side beam, wherein one or more of the plurality of proppant containers longitudinally translate along the bed on the first and second track of rollers.

\* \* \* \* \*